US009858208B2

United States Patent
Connolly et al.

(10) Patent No.: US 9,858,208 B2
(45) Date of Patent: Jan. 2, 2018

(54) SYSTEM FOR SECURING CONTENTS OF REMOVABLE MEMORY

(71) Applicant: International Business Machines Corporation, Armonk, NY (US)

(72) Inventors: Brian J. Connolly, Williston, VT (US); Joab D. Henderson, Pflugerville, TX (US); Jeffrey A. Sabrowski, Leander, TX (US); Saravanan Sethuraman, Bangalore (IN); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/848,464

(22) Filed: Mar. 21, 2013

(65) Prior Publication Data
US 2014/0289488 A1    Sep. 25, 2014

(51) Int. Cl.
*G06F 12/14*    (2006.01)
*G06F 21/79*    (2013.01)

(52) U.S. Cl.
CPC .......... *G06F 12/1466* (2013.01); *G06F 21/79* (2013.01)

(58) Field of Classification Search
CPC .. G06F 12/14; G06F 12/1408; G06F 12/1458; G06F 12/1466
USPC .................. 711/163–164, E12.091, E12.092, 711/E12.093, E12.094; 713/168, 713/171–172, 184–185
See application file for complete search history.

(56) References Cited

U.S. PATENT DOCUMENTS

| | | | |
|---|---|---|---|
| 5,081,675 A | 1/1992 | Kittirutsunetorn | |
| 5,802,175 A * | 9/1998 | Kara .................. | G06F 21/6209 380/277 |
| 6,473,861 B1 | 10/2002 | Stokes | |
| 6,658,566 B1 * | 12/2003 | Hazard ........................ | 713/172 |
| 8,050,410 B2 | 11/2011 | Sanders et al. | |
| 8,756,419 B2 * | 6/2014 | De Atley et al. ............ | 713/165 |
| 2004/0103288 A1 * | 5/2004 | Ziv et al. ..................... | 713/185 |
| 2007/0239996 A1 | 10/2007 | Cromer et al. | |

(Continued)

FOREIGN PATENT DOCUMENTS

WO    WO2012047200 A1    4/2012

OTHER PUBLICATIONS

IBM (Apr. 2009); Hybrid Memory DIMM That Contains Mainstream DRAM With a Secondary DRAM Type to Allow Higher Capacity at Lower Power; IP.com IPCOM000182374D, [2pgs].*

(Continued)

*Primary Examiner* — Ann J Lo
*Assistant Examiner* — Tracy A Warren
(74) *Attorney, Agent, or Firm* — Jared L. Montanaro

(57) ABSTRACT

This disclosure includes a method for securing a memory of an electronic system that includes initializing the memory, creating a security key, transmitting the security key to memory, storing the security key in the memory, transmitting the current security key and a new security key to the memory by the memory controller. If the current security key transmitted is the same as the security key stored in memory, then access to the memory is enabled and the current security key in the memory is replaced with the new security key. If the current security key transmitted is not the same as the security key stored in the memory, then access to the memory is disabled.

20 Claims, 2 Drawing Sheets

(56) References Cited

U.S. PATENT DOCUMENTS

| | | |
|---|---|---|
| 2009/0164744 A1* | 6/2009 | Norman .................. 711/164 |
| 2009/0172681 A1* | 7/2009 | Alexander ............ G11C 7/22 |
| | | 718/103 |
| 2009/0187771 A1 | 7/2009 | McLellan, Jr. |
| 2011/0154061 A1 | 6/2011 | Chilukuri et al. |
| 2011/0185435 A1* | 7/2011 | Chang ........................ 726/27 |
| 2012/0260349 A1 | 10/2012 | Nagai et al. |
| 2013/0121488 A1* | 5/2013 | Kang .................. H04L 9/0894 |
| | | 380/44 |
| 2013/0179964 A1* | 7/2013 | Zawacki et al. ............. 726/16 |

OTHER PUBLICATIONS

Halderman et al., "Lest We Remember: Cold Boot Attacks on Encryption Keys", Center for Information Technology Policy at Princeton University, pp. 1-16. (Appeared in Proc. 17th USENIX Security Symposium, San Jose, CA, Jul. 2008).

* cited by examiner ance on the memory controller and other synchronization between the memory controller and the memory, the data on the memory may become virtually unreadable without the memory controller present.

SYSTEM FOR SECURING CONTENTS OF REMOVABLE MEMORY

TECHNICAL FIELD

This disclosure relates to memory security. In particular, it relates to memory security for a removable memory.

BACKGROUND

A dynamic random access memory (DRAM) stores a bit of data on a capacitor in DRAM cells. The capacitors leak or pick up charge over time, and must be periodically refreshed for the DRAM to retain its data. Under normal operating conditions, the DRAM loses its data over a period of seconds after power has been removed from the DRAM. However, as the temperature of the DRAM decreases, the capacitors leak their charge at a slower rate. If the temperature is low enough, the DRAM may retain its data for minutes or hours after the DRAM has lost power.

The tendency of DRAM to retain its data at low temperatures after removal of power leaves it vulnerable to access by intruders. An intruder with physical access to a computer may bypass mechanisms that protect the computer against outside intrusion. A DIMM containing DRAM may be removed from the computer after the computer has powered down, transferred to another computer, and accessed for its data. This intrusion is a risk for any computer with DRAM, but especially so for a computer utilizing non-volatile storage encryption, as the DRAM could be accessed for the encryption keys to the storage that allow for continued access of the computer system. For example, a hard drive may be protected with an encryption algorithm that is enabled with an encryption key. However, if the hard drive was accessed in the last computer session, the encryption key may remain on the DRAM. The encryption key may be imaged and recovered by the intruder and the DRAM replaced into the original computer, without indication of hacking or access by the intruder.

SUMMARY

In an embodiment, a method for securing a memory of an electronic system includes initializing the memory and recognizing, by the memory, that initialization has occurred. A memory controller creates a current security key and transmits the current security key to the memory. The memory stores the current security key in the memory once. The memory may request that the memory controller retransmit of the current security key. The memory controller retransmits the current security key to the memory and transmits a new security key to the memory. If the current security key retransmitted by the memory controller is the same as the current security key stored in memory, then the memory enables access to the memory by the memory controller and replaces the current security key in the memory with the new security key. If the current security key retransmitted by the memory controller is not the same as the current security key stored in the memory, then the memory disables access to the memory by the memory controller.

In an embodiment, a memory includes a memory array and control logic. The control logic includes a register to store a first security key, an authentication event monitor to identify an authentication event, security key check logic, and signal decode logic. The security key check logic is configured to receive a second security key and compare the second security key received by the memory to the first security key stored on the register. The signal decode logic is configured to enable access to the memory when the second security key received by the memory and the first security key stored in the memory are the same, and disable access to the memory when the second security key received by the memory and the first security key stored in the memory are not the same.

In another embodiment, a method for securing a memory includes receiving initialization data by the memory and recognizing, by the memory, that initialization has occurred. The memory receives a first security key, stores the first security key in the first memory once, and receives a second security key and a third security key by the memory. If the second security key received is the same as the first security key stored in the memory, then the memory enables access to the memory and replaces the second security key in the memory with the third security key. If the second security key received is not the same as the first security key stored in the memory, then the memory disables access to the memory by control logic on the memory.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

According to the principles of the invention, a memory's contents may be secured against a physical intrusion through a remotely generated, synchronized, and periodically authenticated and replaced security key. The memory may be initialized and a memory controller located off a memory module may generate a security key. The security key may be stored on both the memory and the memory controller. During memory operation, the memory may periodically request that the memory controller provide its current security key to the memory. The memory controller transmits the current security key stored on the memory controller to the memory, as well as generates, stores, and sends a new security key to the memory. If the current security key sent to the memory matches the security key stored on the memory, the memory controller may continue to access the memory and the current security key stored on the memory is replaced with the new security key. If the current security key sent by the memory controller does not match the security key stored on the memory, the memory controller is blocked from accessing the memory. After a number of unsuccessful attempts to authenticate its security key, the memory controller may be blocked from accessing the memory until the contents of the memory are wiped and a new security key is generated and synchronized with the memory and memory controller.

Utilizing a unique security key that is synchronized between the memory controller and the memory may effectively tie the data contained on the memory to the electronic system containing the memory controller and on which the data is generated. By focusing the security key authentication at the memory controller level, the security key may be inaccessible to the user of the electronic system. The security key may be replaced at intervals to increase the difficulty of identifying data patterns leading to security key determination. If a valid user is locked out from using the memory due to the memory controller exceeding the attempt limit, the memory is not rendered useless, but must only be wiped of its data.

Method Structure

Figure 1:
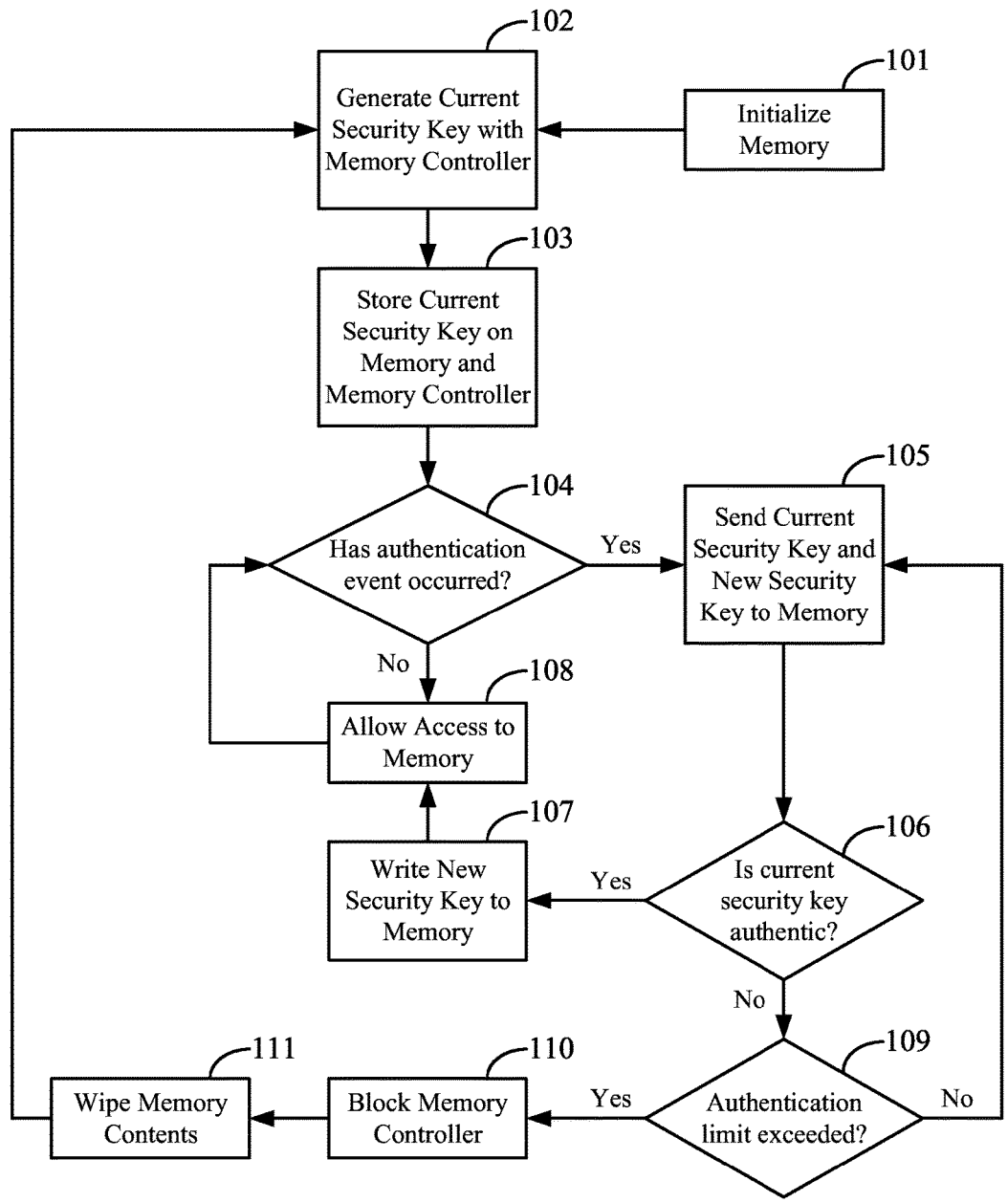
FIG. 1 is a flowchart of a memory security system, according to embodiments of the invention.

FIG. 1 is a flowchart of a memory security system, according to embodiments of the invention. The system initializes a memory, as in 101. The memory may be any removable memory, such as a DRAM or SRAM. After the memory has been initialized and the memory recognizes that it has been initialized, a memory controller may generate a security key, as in 102. A random security key generator on the memory controller may generate the security key and may be activated by an enable bit. The security key may be a word of any length, such as 128 bit, 196 bit, or 256 bit. Multiple security keys may be generated and synchronized for each rank on a DIMM, for a sub-array of a 3D DRAM, for each individual DIMM, and for multiple DIMM's. For example, one rank on a DIMM may be a secured rank requiring security key authentication, while another rank may be unsecured. Alternatively, a first DIMM may be synchronized with a first security key and a second DIMM may be synchronized with a second security key.

The security key may be stored in storage on the memory controller and memory, as in 103. The memory controller may store the security key on a register outside scannable rings, so that no user can directly access the security key, including a valid user. After the memory controller transmits the security key to the memory, the memory may store the security key on a register, such as a multi-purpose register on memory control logic or a buffer chip. The security keys stored on the memory controller and the memory may be backed up for protection against soft errors or power loss, such as through latches or flash storage.

An authentication event monitor may monitor the memory and memory controller for signals that constitute an event requiring security authentication, as in 104. An authentication event may include events such as refresh cycle, access interval, and power state change. For example, one authentication event may be a signal from an authentication event timer that is set to periodically require memory controller authentication; another authentication event may be a refresh signal, if the memory is a DRAM, or an access signal from a memory controller; another authentication event may be an exit command signal coming from the computer system to the memory when the computer system is coming out of a low power mode, such as sleep mode.

Once an authentication event occurs and is recognized by the authentication event monitor, the memory controller must authenticate itself to the memory by sending an authentication signal that includes its current security key, in order to continue accessing the memory, as in 105. The authentication signal may also include a new security key that replaces the current security key once the current security key has been authenticated. The authentication signal may also include ECC to ensure proper transmission of the authentication signal. To generate a transmission of the current security key from the memory controller, the memory's control logic may send a request to the memory controller for the memory controller's current security key. Alternatively, the memory may be in a state where the security key is needed for operation, but where the memory does not communicate back to the memory controller to request a security key. If the current security key is not provided by the memory controller, security key check logic on the memory may block all further attempts by the memory controller to access the memory by temporarily disabling memory control functions, such as chip select and clock enable. These control functions may be controlled through the signal decode logic of a memory's control logic.

Once the memory controller sends the authentication signal, the current security key provided by the memory controller is compared with the security key stored on the memory, as in 106. If the current security key sent by the memory controller matches the security key on the memory, the authentication is successful and the current security key on the memory is replaced with the new security key sent by the memory controller, to be used for the next authentication, as in 107. The memory controller may continue to access the memory, as in 108. If the current security key sent by the memory controller does not match the security key stored on the memory, the authentication is not successful, and the memory controller may not continue to access the memory until it presents the correct security key.

After an unsuccessful authentication attempt, the memory controller may continue to attempt to authenticate its security key until an authentication limit is exceeded, such as an access counter exceeding an access counter threshold, as in 109. The access counter may return to a starter value when the security key sent by the memory controller is authenticated. The access counter for the number of memory controller attempts may be set sufficiently high to allow for soft errors that may occur during transmission of the current security key. When the access counter is exceeded, the memory controller may be disabled from accessing the memory, as in 110, until the contents of the memory are wiped. Once the contents of the memory are wiped, as in 111, the security key generation process may be started over again.

As an additional safeguard, a computer system having multiple DRAM modules may lock out all the DRAM in the computer system when it is detected that a DRAM has been locked out by the method discussed above or a DRAM module removed from the system. If one DRAM module is locked out, the locked out DRAM may send a signal that locks out the other DRAM modules.

Hardware Implementation

Figure 2:
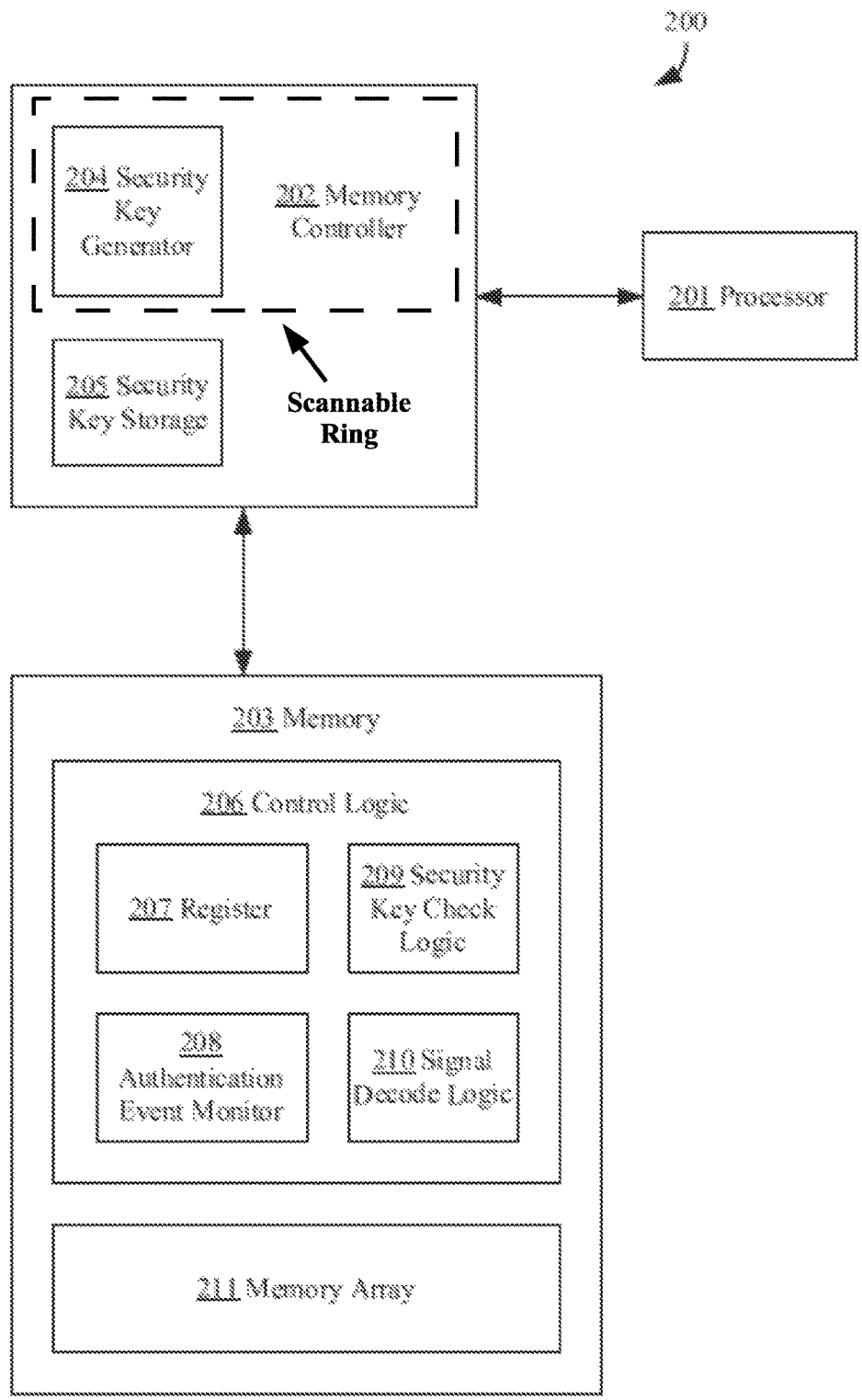
FIG. 2 is a diagram of an electronic system with a memory security mechanism, according to embodiments of the invention.

FIG. 2 is a diagram of an electronic system 200 with a memory security mechanism, according to embodiments of the invention. A security key generator 204 on a memory controller 202 generates a security key. The security key is stored in security key storage 205 on the memory controller 202 and written into a register 207 on control logic 206 of a memory 203. A processor 201 may access a memory array 211 through the memory controller 202 until an authentication event monitor 208 indicates that an authentication event has occurred. While in FIG. 2 the memory controller 202 and processor 201 are represented as different units, the memory controller 202 may also be part of the processor 201.

Upon an authentication event, the control logic 206 of the memory 203 may send a request to the memory controller 202 to provide the memory controller's security key for authentication. The memory controller 202 must present the same security key that is stored in the register 207 of the memory 203 to continue to access the memory array 211. Security key check logic 209 on the memory 203 may compare the security key provided by the memory controller 202 with the security key stored in the register 207. If the security keys are the same, signal decode logic 210 may continue to allow the memory controller 202 to access the memory array 211. If the security keys are not the same, the signal decode logic 210 may prevent the memory controller 202 from accessing the memory array 211 until the memory controller 202 presents the correct security key. After a number of unsuccessful attempts to authenticate the security key, the signal decode logic 210 may prevent the memory controller 202 from controlling select functions of the memory 203 until the memory array 211 is wiped and a new security key synchronized between the memory controller 202 and the memory 203. If the signal decode logic 210 prevents the memory controller 202 from controlling select functions of the memory 203, the control logic 206 may send a lockout signal to the signal decode logic 210 of other memories 203 so that the memory controller 202 is prevented from controlling select functions of their memory 203.

Although the present invention has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the invention.

What is claimed is:

1. A method for securing a first memory of an electronic system comprising:
    initializing the first memory, the first memory including one or more memory modules, each module including a circuit board having two or more memory chips mounted thereon;
    recognizing, by the first memory, that initialization has occurred;
    generating a current security key by a memory controller using a random security key generator on the memory controller, the memory controller being located off the one or more memory modules;
    storing the current security key on a register in the memory controller, wherein the register is outside of scannable rings, and wherein the register outside of scannable rings is a register that is not directly accessible by a valid user;
    transmitting, by the memory controller, the current security key to the first memory;
    storing the current security key on a second register in the first memory once;
    requesting, by control logic in the first memory, a retransmission of the current security key from the memory controller when an authentication event occurs;
    retransmitting the current security key to the first memory by the memory controller;
    transmitting a new security key to the first memory by the memory controller, wherein transmitting the new security key to the first memory is done simultaneous to retransmitting the current security key;
    determining if the current security key retransmitted is the same as the current security key stored in the first memory;
    enabling, in response to determining that the current security key retransmitted is the same as the current security key stored in the first memory, access to the first memory and replacing the current security key in the first memory with the new security key by control logic on the first memory; and
    disabling, in response to determining that the current security key retransmitted is not the same as the current security key stored in the first memory, access to the first memory by the control logic on the first memory.

2. The method of claim 1, further comprising:
    erasing data stored on the first memory in response to determining that the current security key retransmitted is not the same as the current security key stored in the first memory; and
    enabling access to the first memory when the data stored on the first memory is erased and the first memory is initialized.

3. The method of claim 2, further comprising:
    incrementing an access counter when the memory controller retransmits the current security key and the current security key does not match the current security key stored in the first memory;
    disabling access to the first memory when the access counter exceeds an access counter threshold, wherein the first memory is disabled until contents of the first memory are wiped and the new security key is generated and synchronized with the first memory and the memory controller; and
    returning the access counter to a starter value when the new security key is synchronized with the first memory and the memory controller.

4. The method of claim 1, wherein the authentication event is an authentication signal from a timer set to periodically cause the first memory to request retransmission of the current security key from the memory controller, and wherein the authentication signal includes an error-correcting code (ECC) to ensure proper transmission of the authentication event, and wherein the timer does not change the state of the electronic system.

5. The method of claim 1, further comprising transmitting, by the control logic in the first memory, a first lockout signal to a second memory controlled by the memory controller, wherein the first lockout signal disables the second memory from being accessed by the memory controller.

6. The method of claim 1, further comprising:
    receiving, by the first memory, a second lockout signal from a third memory controlled by the memory controller; and
    disabling access to the first memory when the second lockout signal is received.

7. The method of claim 1, wherein the first memory stores the current security key on a buffer chip and a back-up of the current security key on a flash storage unit.

8. A memory comprising:
    a memory module having a memory array, the module including a circuit board having two or more memory chips mounted thereon; and
    control logic mounted on the circuit board, wherein the control logic comprises:
        a register to store a first security key received from a memory controller, the memory controller being located off the memory module, wherein the register is outside of scannable rings, and wherein the register outside of scannable rings is a register that is not directly accessible by a valid user;
        an authentication event monitor to identify an authentication event, wherein an authentication event includes a power state change,
        wherein the control logic is configured to request retransmission of a second security key when the authentication event occurs;
    security key check logic configured to:

receive the second security key from the memory controller, wherein the first and second security keys are created using a random security key generator on the memory controller;

compare the second security key received by the memory to the first security key stored on the register; and signal decode logic configured to respond to identification of an authentication event by:

enabling access to the memory when the second security key received by the memory and the first security key stored in the memory are the same; and disabling access to the memory when the second security key received by the memory and the first security key stored in the memory are not the same.

9. The memory of claim 8, wherein:

the control logic further comprises an access counter that is configured to:

increment when the memory receives the second security key, and return to a starter value when the second security key received by the memory and the current security key stored on the register are the same; and wherein the signal decode logic is further configured to block control signals to the memory when the access counter exceeds an access counter threshold.

10. The memory of claim 9, wherein:

the signal decode logic is configured to accept control signals after the contents of the memory are erased; and the access counter returns to a starter value when the contents of the memory are erased.

11. The memory of claim 8, wherein the control logic is configured to transmit a first lockout signal when the signal decode logic blocks control signals to the memory.

12. The memory of claim 8, wherein the control logic is configured to receive a second lockout signal and disable the memory from being accessed when the second lockout signal is received.

13. The method of claim 8, wherein disabling access to the memory when the second security key received by the memory and the first security key stored in the memory are not the same includes disabling a chip select memory control function and a clock enable memory control function of the memory.

14. A method for securing a memory comprising:

receiving initialization data by the memory, the memory including one or more memory modules, each module including a circuit board having two or more memory chips mounted thereon;

recognizing, by the memory, that initialization has occurred;

receiving, by the memory, a first security key from a memory controller, wherein the first security key is generated using a random security key generator on the memory controller, the memory controller being located off the one or more memory modules;

storing the first security key on a register in the first memory once, wherein the register is outside of scannable rings, and wherein the register outside of scannable rings is a register that is not directly accessible by a valid user;

requesting, by a control logic in the memory, a retransmission of a second security key when an authentication event occurs;

receiving the second security key and a third security key by the memory from the memory controller, wherein the third security key is generated using the random security key generator on the memory controller;

determining if the second security key received is the same as the first security key stored in the memory;

enabling, in response to determining that the second security key received is the same as the first security key stored in the memory, access to the memory and replacing the second security key in the memory with the third security key by control logic on the memory; and disabling, in response to determining that the second security key received is not the same as the first security key stored in the memory, access to the memory by the control logic on the memory.

15. The method of claim 14, further comprising:

erasing data stored on the memory in response to determining that the second security key received is not the same as the first security key stored in the memory; and enabling access to the memory when the data stored on the memory is erased and the memory is initialized.

16. The method of claim 14, further comprising:

incrementing an access counter when the memory receives the second security key and the second security key does not match the first security key stored in the memory;

disabling access to the memory when the access counter exceeds an access counter threshold, wherein the memory is disabled until contents of the memory are wiped and the second security key is generated and synchronized with the memory and the memory controller; and returning the access counter to a starter value when the second security key is synchronized with the first memory and the memory controller.

17. The method of claim 14, wherein the authentication event includes a dynamic random access memory (DRAM) refresh signal.

18. The method of claim 14, further comprising transmitting a second lockout signal when the control logic disables access to the memory.

19. The method of claim 14, further comprising receiving a first lockout signal, wherein the first lockout signal disables the memory from being accessed until contents of the memory are wiped and a new security key is generated and synchronized with the memory and the memory controller.

20. The method of claim 14, further comprising:

determining that a first dual in-line memory module (DIMM) includes a secured rank, wherein the secured rank requires security key authentication;

determining that a second DIMM includes an unsecured rank, wherein the unsecured rank does not require security key authentication;

generating a first associated security key for the first DIMM; and synchronizing the first DIMM with the first associated security key.

* * * * *